(12) United States Patent
Bassi et al.

(10) Patent No.: US 7,474,799 B2
(45) Date of Patent: Jan. 6, 2009

(54) SYSTEM AND METHOD FOR ELECTRONIC CORRECTION OF OPTICAL ANOMALIES

(75) Inventors: Zorawar S. Bassi, Markham (CA); Louie Lee, Richmond Hill (CA); Gopal Ramachandran, Los Gatos, CA (US)

(73) Assignee: Silicon Optix Inc., San Jose, CA (US)

( * ) Notice: Subject to any disclaimer, the term of this patent is extended or adjusted under 35 U.S.C. 154(b) by 850 days.

(21) Appl. No.: 10/461,320

(22) Filed: Jun. 12, 2003

(65) Prior Publication Data

US 2004/0076336 A1 Apr. 22, 2004

Related U.S. Application Data

(60) Provisional application No. 60/387,596, filed on Jun. 12, 2002.

(51) Int. Cl.
  G06K 9/40 (2006.01)
  H04N 5/00 (2006.01)
  H04N 1/40 (2006.01)
  H04N 1/38 (2006.01)

(52) U.S. Cl. ............... 382/275; 382/254; 348/606; 358/447; 358/463

(58) Field of Classification Search ............... 382/254, 382/275
See application file for complete search history.

(56) References Cited

U.S. PATENT DOCUMENTS

| | | |
|---|---|---|
| 4,943,155 A | 7/1990 | Cross, Jr. |
| 5,055,922 A | 10/1991 | Wessling |
| 5,086,338 A | 2/1992 | Usui |
| 5,200,815 A | 4/1993 | Tsujihara et al. |
| 5,231,481 A | 7/1993 | Eouzan et al. |

(Continued)

FOREIGN PATENT DOCUMENTS

WO WO 00/07376 2/2000

OTHER PUBLICATIONS

Steele et al., "Monitoring and Correction of Geometric Distortion in Projected Displays", Department of Computer Science, University of Kentucky, XP-002282237, vol. 10, No. 1 to 2, Apr. 3, 2002.

(Continued)

*Primary Examiner*—Matthew C Bella
*Assistant Examiner*—Randolph Chu
(74) *Attorney, Agent, or Firm*—Sughrue Mion, PLLC (57) ABSTRACT

An electronic correction system and method for correcting optical anomalies, namely distortions, color non-convergence (excluding axial chromatic aberration) and luminance (or chrominance) non-uniformity. Each effect is modeled as a transformation in either spatial (positional) space or color space. Representing the effects as transformations of digital pixel data, allows the different anomalies to be resolved within a common framework, namely that of image 'warping'. The anomaly, having been expressed as a pixel transformation, is then eliminated by electronically applying the inverse transformation. This process is equivalent to digitally manipulating or warping the image in position and/or color space and accordingly this can be achieved using commercially known warping circuits. In addition, the transformation can also contain a component to additionally perform any application specific image warping (e.g. scaling and geometric transformations). Finally, by storing a sequence of transformations, adaptive anomaly correction and dynamic effects can be achieved.

34 Claims, 9 Drawing Sheets

U.S. PATENT DOCUMENTS

| | | | |
|---|---|---|---|
| 5,369,450 A | 11/1994 | Haseltine et al. | |
| 5,499,139 A | 3/1996 | Chen et al. | |
| 5,838,396 A | 11/1998 | Shiota et al. | |
| 5,870,505 A | 2/1999 | Wober et al. | |
| 5,889,625 A | 3/1999 | Chen et al. | |
| 6,012,375 A | 1/2000 | Eckstein | |
| 6,069,982 A * | 5/2000 | Reuman | 382/275 |
| 6,111,701 A | 8/2000 | Brown | |
| 6,144,498 A | 11/2000 | Bryars et al. | |
| 6,172,815 B1 | 1/2001 | Hashizume et al. | |
| 6,288,756 B1 | 9/2001 | Shiota et al. | |
| 6,323,934 B1 | 11/2001 | Enomoto | |
| 6,418,242 B1 * | 7/2002 | Maurer | 382/266 |
| 6,459,818 B1 * | 10/2002 | George | 382/254 |
| 6,628,823 B1 * | 9/2003 | Holm | 382/162 |
| 6,728,414 B1 * | 4/2004 | Chang et al. | 382/254 |
| 6,816,625 B2 * | 11/2004 | Lewis et al. | 382/275 |
| 2001/0040998 A1 * | 11/2001 | Roetling | 382/162 |
| 2002/0164083 A1 * | 11/2002 | Song et al. | 382/275 |
| 2003/0222892 A1 * | 12/2003 | Diamond et al. | 345/647 |
| 2004/0130669 A1 | 7/2004 | Shin et al. | |
| 2004/0156558 A1 | 8/2004 | Kim | |

OTHER PUBLICATIONS

Raskar et al., "A Self-Correcting Projector", Proceedings 2001 IEEE Conference on Computer Vision and Pattern Recognition, vol. 1 of 2, Dec. 8, 2001.

* cited by examiner

SYSTEM AND METHOD FOR ELECTRONIC CORRECTION OF OPTICAL ANOMALIES

This application claims the benefit under 35 U.S.C. 119(e) of U.S. Provisional Application No. 60/387,596, filed Jun. 12, 2002.

FIELD OF THE INVENTION

This invention relates to electronic correction of optical anomalies and more particularly to electronic correction of distortion, lateral chromatic aberration, luminance non-uniformity, and chrominance non-uniformity, which can be combined with a general image transform (e.g. scaling and geometric transform).

BACKGROUND OF THE INVENTION

Conventional image capture or display devices are prone to various forms of optical anomalies. These anomalies are inherent to the non-ideal behavior of the various optical elements and to accuracy and tolerance of assembly. Various components (sensors, displays, lens, prisms, mirrors, light source), optical or otherwise, and their orientation may introduce their own specific optical anomalies, such as distortion, tilt, lateral chromatic aberration, luminance or chrominance non-uniformity. The term optical aberration is generally used to refer to any effect that leads to an non-ideal image formation.

Optical aberrations include diffraction effects (due to the wave nature of light), chromatic aberrations (caused by optical dispersion, or the differences in refraction in different wavelengths of light), and monochromatic aberrations (of which spherical aberration, coma, and astigmatism are concerned with failures of a point object to form a point image, and field curvature and distortion are concerned with the failure of finite objects perpendicular to the principal axis to form a well-focused plane image). One can also loosely group optical aberrations into two types, ones that affect image quality and ones that affect image shape. The former types degrade the sharpness of an image, that is, the image appears blurred, and/or out of focus, and/or has color fringes. Aberrations in this category include spherical aberrations, astigmatism, coma, field of curvature and axial chromatic aberration. The latter types of aberrations affect the shape of the image that in part may be induced by the former aberration or by the correction and optimization of the former aberration. In this case, points in the object plane are shifted or distorted in comparison with an ideal mapping in the image plane. In an ideal mapping an object in the image plane will appear as it does in the object plane, with possibly a uniform scale change. For example, an image may appear curved near the edges or appear rotated. Aberrations in this second category include distortions (e.g. pincushion/barrel effects) and lateral chromatic aberrations.

With the exception of chromatic aberrations, all other optical aberrations are present in monochromatic (i.e. single color) light. Chromatic aberration appears when dealing with polychromatic light (many colors). In short, the index of refraction is wavelength dependent, which means that the red, green and blue components bend differently at an optical interface. This leads to axial (longitudinal) and/or lateral chromatic aberration effects. In axial chromatic aberration, the three components are brought to focus on different planes in the image space, which gives a color blurring effect. In other words, axial chromatic aberration arises due to the focal length varying with wavelength (color). In lateral chromatic aberration, color components from a single point are brought to focus to different points on the same image plane. This has the effect of magnifying the three colors differently and can be visually seen as 'color fringing'. Thus lateral chromatic aberration can be seen as an effect due to magnification varying with wavelength. The three colors can also mismatch due to non-optical effects. In a three-color display system, if the displays are not correctly aligned, color defects will be seen. The term color non-convergence is used to refer to color mismatch effects, whether optical (as in chromatic aberrations) or not. Further discussion on optical aberrations can be found in conventional optics textbooks, such as Robert Guenther's *Modern Optics*, published by John Wiley & Sons, 1990, hereby incorporated by reference.

Another important optical anomaly in conventional capture/display devices is luminance non-uniformity. Luminance non-uniformity leads to varying brightness across an image. Common causes include a varying (in brightness) light source, varying optical path across the image plane, non-uniform sensor response and irregularities in panels (e.g. LCD, LCOS, etc.). Both large-scale and small-scale non-uniformities can be present. In a three-color system, brightness variation can be different for each color, leading to chrominance non-uniformity.

There have been a number of prior art attempts to correct aberrations that affect the shape of the image, without introducing blur, namely correction of distortion, lateral chromatic aberration and luminance or chrominance (brightness) non-uniformity. Generally, such prior art attempts are geared towards one specific type of anomaly.

For example, lateral chromatic aberration is commonly corrected (or minimized) using special optical elements, often consisting of prism/lens combinations and/or special material coatings such as that disclosed in U.S. Pat. No. 4,943,155 to Cross, U.S. Pat. No. 5,086,338 to Usui, U.S. Pat. No. 5,499,139 to Chen et al., U.S. Pat. No. 6,023,375 to Kreitzer, U.S. Pat. No. 6,111,701 to Brown, U.S. Pat. No. 6,144,498 to Bryars et al., and U.S. Pat. No. 6,172,815 to Hashizume et al. However, the physical implementation of the solutions disclosed in these references are expensive and bulky. Further, the specialized nature of these designs necessarily restrict them to specific types of applications. Typically, these methods are aimed at display/projection systems or head up/mounted display systems.

A number of electronic solutions have also been presented such as those disclosed in U.S. Pat. No. 5,838,396 to Shiota et al., U.S. Pat. No. 5,870,505 to Munib et al., U.S. Pat. No. 6,288,756 to Shiota et al., U.S. Pat. No. 5,200,815 to Tsujihara et al., U.S. Pat. No. 5,369,450 to Haseltine et al, U.S. Pat. No. 5,889,625 to Chen et al., and U.S. Pat. No. 6,323,934 to Enomoto et al. All of these approaches rely on some type of image "warping". A discussion of image warping can be found in George Wolberg, *Digital Image Warping*, IEEE Computer Society Press, 1988, hereby incorporated by reference.

The warping data (i.e. data which describes how the image is to be transformed) may be used to adjust the digital image (e.g. as in U.S. Pat. No. 5,369,450 to Haseltine et al. and U.S. Pat. No. 5,889,625 to Chen et al.) or to adjust the operation of the electronics that display/project the image (e.g. as in U.S. Pat. No. 5,200,815). These electronic solutions concentrate on specific anomalies, such as luminance correction (e.g. U.S. Pat No. 5,838,396 to Shiota et al., U.S. Pat. No. 5,870,505 to Woeber et al, U.S. Pat. No. 6,288,756 to Shiota et al.), distortion and chromatic aberration (e.g. U.S. Pat. No. 5,200,815 to Tsujihara et al., U.S. Pat. No. 5,369,450 to Haseltine et al, U.S. Pat. No. 5,889,625 to Chen et al., and U.S. Pat. No. 6,323,934 to Enomoto et al.) or specific types of systems, such as head-mounted displays. Those solutions that do correct for all three anomalies (e.g. U.S. Pat. No. 6,323,934 to Enomoto et al.) are not real-time in nature. Other limitations of prior art electronic solutions are that they do not allow for application specific "correction" (i.e. correction which does not correspond to an optical anomaly correction) and/or they do not provide for dynamic anomaly correction. For example, it can be desirable in certain video applications to combine anomaly correction (brightness non-uniformity as well as pincushion distortion) with a keystone correction (caused by off-axis projection) and curvature correction for planar/curved surfaces.

SUMMARY OF THE INVENTION

The invention provides in one aspect, electronic correction method for correcting a plurality of optical anomalies associated with the capture and display of an optical image processed through optical capture and display components having a particular geometry, by compensation of the digital image pixel data associated with the optical image, said method comprising:

(a) identifying and representing the optical anomalies associated with the physical and geometrical characteristics of the capture and display optical components as an optical anomaly grid dataset;

(b) identifying and representing the ideal behavior of the capture and display optical components as an ideal grid dataset;

(c) comparing the optical anomaly grid dataset with the ideal grid dataset and determining an anomaly correcting transformation dataset by performing an inverse spatial transform from the ideal grid dataset to the anomaly transform such that functional composition of the anomaly correcting transformation with the optical anomaly grid dataset reduces to the ideal grid dataset;

(d) applying the anomaly correcting transformation dataset to the image pixel data to produce corrected image pixel data which when viewed is free of the optical anomaly.

The invention provides in another aspect, an electronic correction system for correcting a plurality of optical anomalies associated with the capture and display of an optical image processed through optical capture and display components having a particular geometry, by compensation of the digital image pixel data associated with the optical image, said system comprising an image processor for:

(a) identifying and representing the optical anomalies of the physical and geometrical characteristics of the capture and display optical components as an optical anomaly grid dataset;

(b) identifying and representing the ideal behavior of the image data processing chain as an ideal grid dataset;

(c) comparing the optical anomaly grid dataset with the ideal grid dataset and determining an anomaly correcting transformation dataset by performing an inverse spatial transform from the ideal grid dataset to the anomaly transform such that functional composition of the anomaly correcting transformation with the optical anomaly grid dataset reduces to the ideal grid dataset;

(d) applying the anomaly correcting transformation dataset to the image pixel data to produce corrected image pixel data which when viewed is free of the optical anomaly.

The invention provides in another aspect, a computer-readable medium having computer-readable code embodied therein for correcting a plurality of optical anomalies associated with the capture and display of an optical image processed through optical capture and display components having a particular geometry, by compensation of the digital image pixel data associated with the optical image, by:

(a) identifying and representing the optical anomalies of the physical and geometrical characteristics of the capture and display optical components as an optical anomaly grid dataset;

(b) identifying and representing the ideal behavior of the image data processing chain as an ideal grid dataset;

(c) comparing the optical anomaly grid dataset with the ideal grid dataset and determining an anomaly correcting transformation dataset by performing an inverse spatial transform from the ideal grid dataset to the anomaly transform such that functional composition of the anomaly correcting transformation with the optical anomaly grid dataset reduces to the ideal grid dataset;

(d) applying the anomaly correcting transformation dataset to the image pixel data to produce corrected image pixel data which when viewed is free of the optical anomaly.

Further aspects and advantages of the invention will appear from the following description taken together with the accompanying drawings.

DETAILED DESCRIPTION OF THE INVENTION

Figure 1:
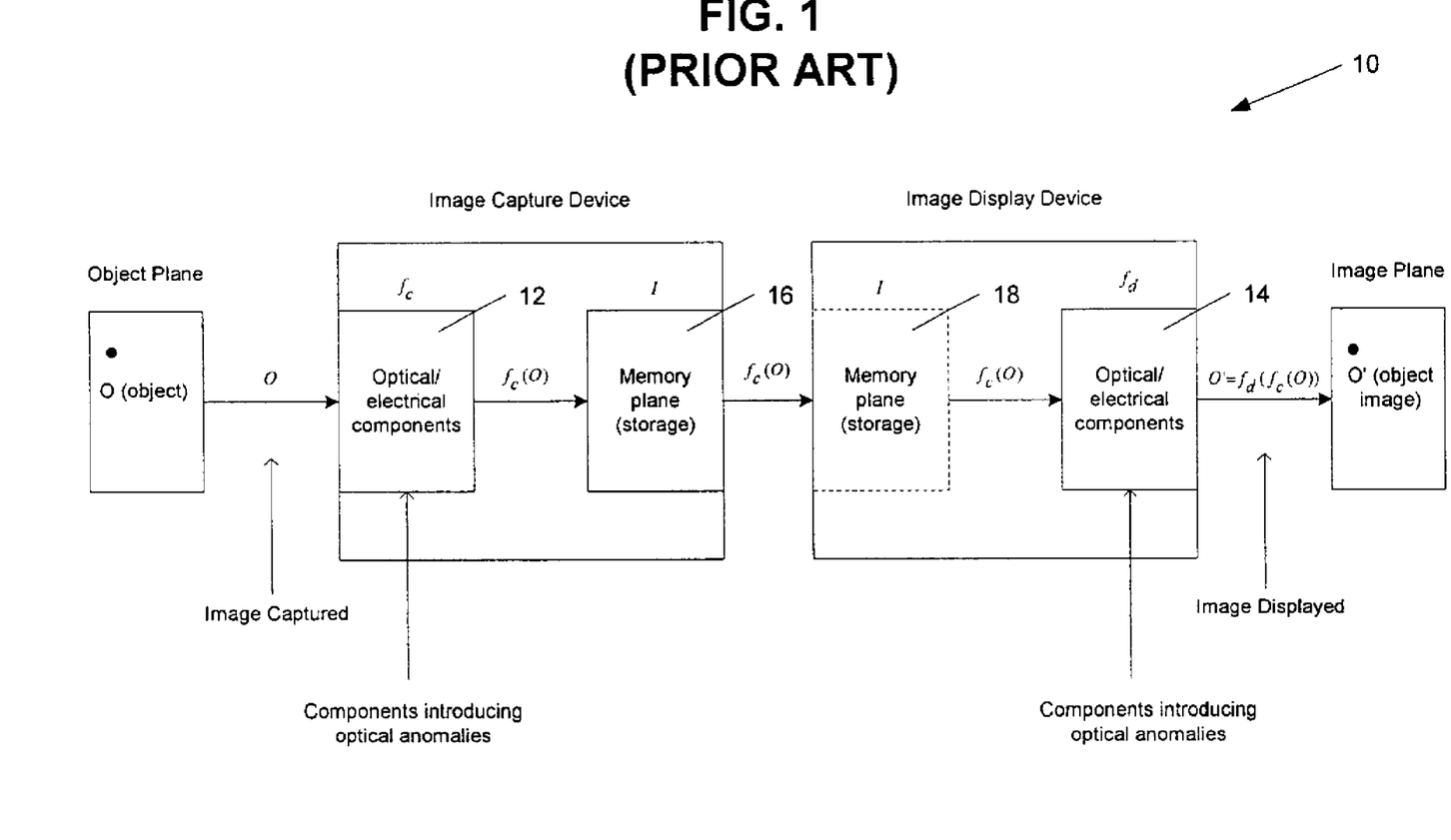
FIG. 1 is a schematic diagram illustrating a conventional prior art integrated capture and display device and its corresponding image processing chain.

FIG. 1 illustrates the main elements of a conventional image capture/display device 10 and the optical anomalies present within the corresponding image processing chain that is represented as image (i.e. pixel level) transformations. As shown, an object O in the object plane is mapped, via the image processing chain, onto an object O' in the image plane. Capture/display device 10 contains various elements, including optical elements e.g. lenses, prisms, mirrors, etc.) and non-optical elements (e.g. electronic sensors and display panels) 12 and 14 some or all of which may introduce an optical anomaly into the image processing chain as shown. Capture/display device 10 also includes memory (i.e. storage) 16 and 18 as shown.

Each optical anomaly acts in the spatial space (affecting the shape of the imaged object) and/or in the color space (affecting the brightness/color of the imaged object). These effects can be represented as transformations or mappings of (a) pixel positions and (b) pixel colors, that are applied somewhere between the memory plane (space) 16 and 18 and the corresponding object/image plane. Accordingly, these transformations define the optical anomalies. It should be understood that the current representation does not consider differential focus anomalies as differential focus problems cannot be corrected electronically.

FIG. 1 shows the processing chain where the maps representing the collective effect of all the anomalies on the capture side (defined by subscript c) by $f_c$ and on the display side (defined by subscript d) by $f_d$. The optical anomalies present within capture/display device 10 are represented by these maps. The map I associated with storage at the memory plane 20 represents the identity map, which indicates that is there is no change in the image as the memory planes 16 and 18 do not introduce any anomalies. It should be noted that the term optical anomaly is used to refer to any effect that leads to an non-ideal image formation, in particular this includes aberrations and luminance non-uniformity.

Figure 2:
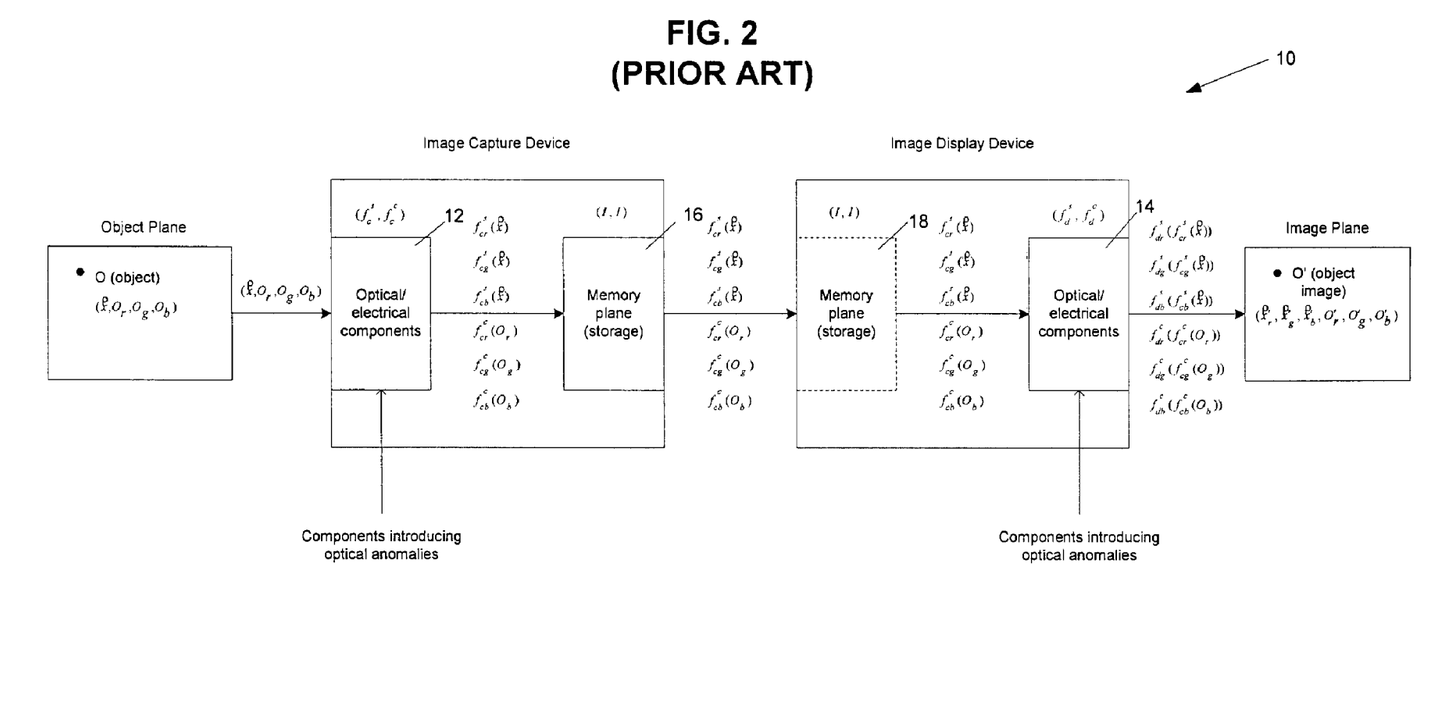
FIG. 2 is a schematic diagram illustrating a detailed processing chain and the various transformations that represent the optical defects within the prior art integrated capture and display device of FIG. 1.

FIG. 2 illustrates how the map $f_c$ can be further split into $f_c^s$ and $f_c^c$, where $f_c^s$ describes spatial anomalies (superscript s) and $f_c^c$ describes color anomalies (superscript c). Since each color component may transform differently, $f_c^s$ and $f_c^c$ should be replaced by $$f_{cr}^s, f_{cg}^s, f_{cb}^s \text{ and } f_{cr}^c, f_{cg}^c, f_{cb}^c,$$

for the red, green and blue components (second subscripts r,g,b). The notation $f_c^s$ and $f_c^c$ will be used when referring to all three component functions together. Similarly, the spatial/color maps representing the anomalies on the display side are denoted by $f_d^s$ and $f_d^c$ with their color components $$f_{dr}^s, f_{dg}^s, f_{db}^s, f_{dr}^c, f_{dg}^c$$

and $$f_{db}^c.$$

It should be noted that the specifics (size, type, etc.) of the memory planes are system dependent and that the memory planes shown represent conceptual domains for the various maps rather than actual hardware implementations of storage. In particular, the memory plane on the display side is shown in dotted outline to indicate that it need not be present in a specific device, Instead, a captured image may be directly displayed without being stored. If additional processing is conducted in the display part of capture/display device 10 (e.g. frame rate conversion) then some form of physical memory will be required. Furthermore, the memory plane on the capture side does need not be full frame.

An object O in the object plane is defined by its 2D position vector $\vec{x}$ (for a point) and its RGB value $(O_r, O_g, O_b)$ In its digital form, the point object is approximated by a pixel. Due to chromatic aberration, the color components of this object will be mapped to different points in the image plane. In general, the single point will be mapped to three points as the three colors are brought to focus to different points (on the same plane). Thus, the image of the object in the image plane will be described by three position vectors $(\vec{x}'_r, \vec{x}'_g, \vec{x}'_b)$ and the corresponding color values $(O'_r, O'_g, O'_b)$ It is also useful to introduce the notation $(\vec{x}_r, \vec{x}_g, \vec{x}_b)$ for the spatial coordinates of the three colors in the object space, with the understanding that for a given point we have $\vec{x}=\vec{x}_r=\vec{x}_g=\vec{x}_b$.

Combining everything, the processing of a point object O (or pixel) through capture/display device 10 in the presence of optical anomalies can be expressed by the following mappings (all spatial maps are represented as vector functions, although to simplify notation the vector arrow has been omitted):

$$\left(\overset{p}{x}, O_r, O_g, O_b\right) \rightarrow \left(\overset{p}{x'_r}, \overset{p}{x'_g}, \overset{p}{x'_b}, O'_r, O'_g, O'_b\right) \tag{1}$$

$$\overset{p}{x'_r} = f_{dr}^s\!\left(f_{cr}^s(\overset{p}{x})\right) \tag{2}$$

$$\overset{p}{x'_g} = f_{dg}^s\!\left(f_{cg}^s(\overset{p}{x})\right) \tag{3}$$

$$\overset{p}{x'_b} = f_{db}^s\!\left(f_{cb}^s(\overset{p}{x})\right) \tag{4}$$

$$O'_r = f_{dr}^c(f_{cr}^c(O_r)) \tag{5}$$

$$O'_g = f_{dg}^c(f_{cg}^c(O_g)) \tag{6}$$

$$O'_b = f_{db}^c(f_{cb}^c(O_b)). \tag{7}$$

The corresponding image processing chain is shown in FIG. 2. The notation q z), for a mapping q and variable z, means that q acts to modify z only, changing it to a new value of the same type (i.e. a new position value or a new color value). The mapping q can also depend on other variables, however in order to simplify the notation, these are not shown. For example, z'=q(z,w) is written as z'=q(z). In general, all spatial mappings depend only on spatial variables, whereas the color mappings can depend on both spatial and color variables, as will be further described.

Figure 3:
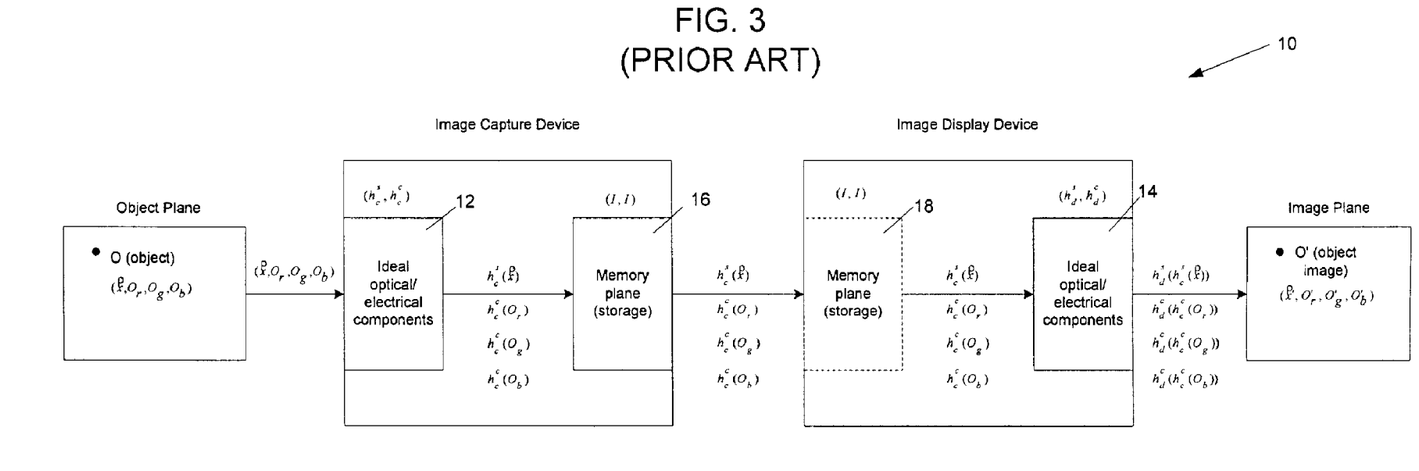
FIG. 3 is a schematic diagram that illustrates an ideal processing chain in the absence of any optical defects.

FIG. 3 illustrates the ideal behaviour of capture/display device 10. To correct the various optical anomalies, we also need to describe the 'ideal' capture/display device in the absence of any anomalies. The correcting maps will try to restore this ideal behavior. In the absence of any lateral chromatic aberration we will have the following relation:

$$\overset{p}{x'_r} = \overset{p}{x'_g} = \overset{p}{x'_b} \equiv \overset{p}{x'}, \tag{8}$$

where $$\overset{p}{x'}$$

represents the common vector for all three colors. Additionally, in the absence of any distortion one expects the following relation:

$$\overset{\rho}{x'} = k\overset{\rho}{x}, \quad (9)$$

where capture/display device 10 only linearly scales objects in the object plane. The value "k" represents a spatial scaling constant. Thus zooming operations are not considered as distortions (when such operations are identical for each color). Lastly, for uniform luminance/chrominance one expects the following relation:

$$O'_r = sO_r + m \quad (10)$$

$$O'_g = sO_g + m \quad (11)$$

$$O'_b = sO_b + m, \quad (12)$$

where the same change in each color component occurs all across the image (independent of $\overset{\rho}{x}$). The "s" and "m" values represent the uniform luminance/chrominance gain and offset values applied, respectively. The processing of a point object O (or pixel) through capture/display device 10 in the absence of any optical anomalies can be expressed by the following mappings (using h for the ideal mappings):

$$(\overset{\rho}{x}, O_r, O_g, O_b) \rightarrow (\overset{\rho}{x'}, O'_r, O'_g, O'_b) \quad (13)$$

$$\overset{\rho}{x'} = h^s_d(h^s_c(\overset{\rho}{x})) \quad (14)$$

$$O'_r = h^c_d(h^c_c(O_r)) \quad (15)$$

$$O'_g = h^c_d(h^c_c(O_g)) \quad (16)$$

$$O'_b = h^c_d(h^c_c(O_b)), \quad (17)$$

where $h^s_c$, $h^c_c$, $h^s_d$ and $h^c_d$ are constrained by equations (9)-(12), and are limiting forms for $$f^s_{ci}, f^c_{ci}, f^s_{di} \text{ and } f^c_{di},$$

i=r,g,b. In the limit of vanishing anomalies we have:

$$f^s_{ci} \rightarrow h^s_c, f^c_{ci} \rightarrow h^c_c, f^s_{di} \rightarrow h^s_d, f^c_{di} \rightarrow h^c_d, i = r, g, b. \quad (18)$$

It should be understood that other forms of ideal behavior can be specified, and that the equations above, namely (9)-(12) are just one example representation.

Figure 4:
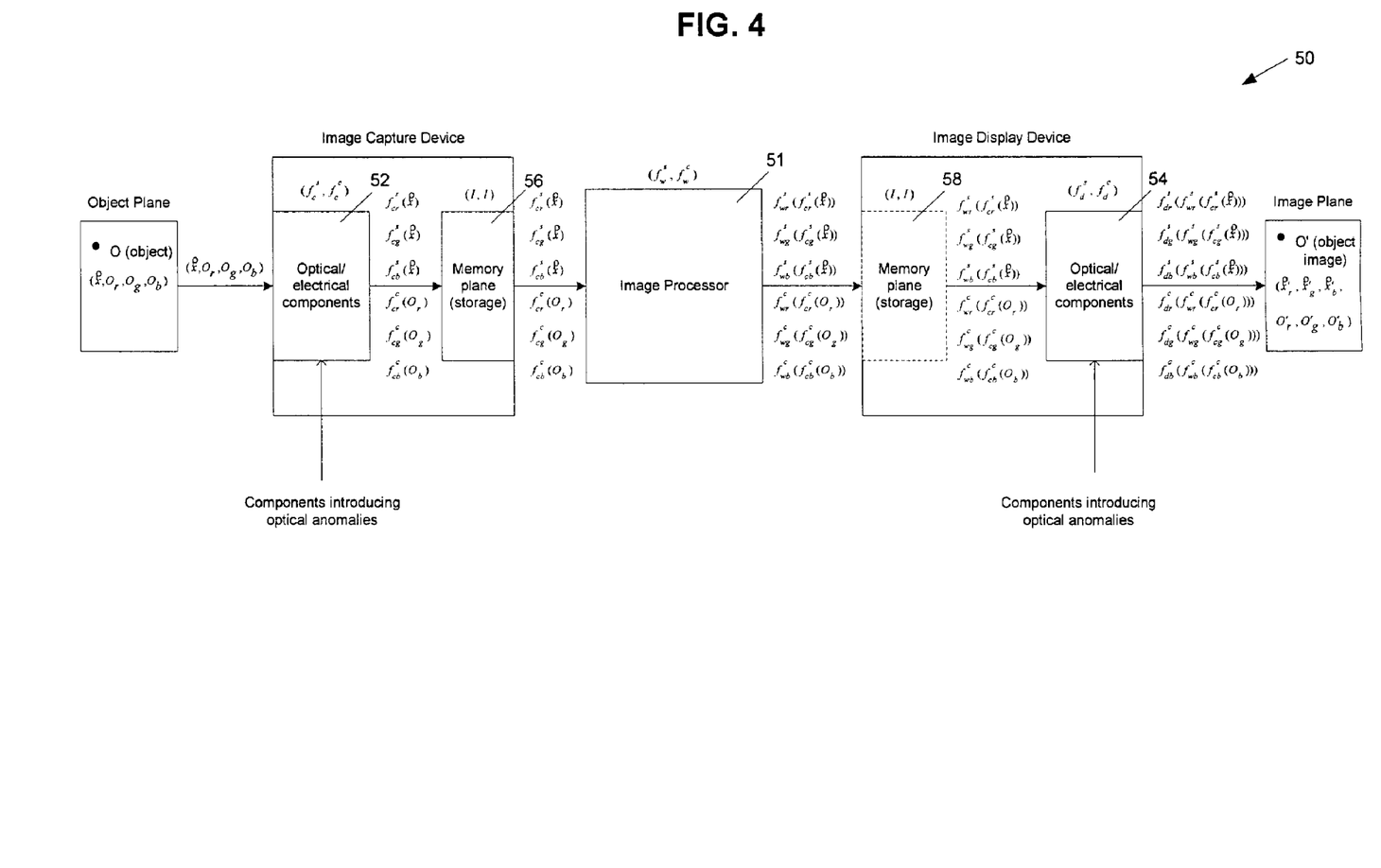
FIG. 4 is a schematic diagram of an example of an electronic correction system of the present invention.

FIG. 4 illustrates the main elements associated with the electronic correction system 50, made accordance with the present invention. Electronic correction system 50 uses image processor 51 to eliminate optical anomalies common to image capture/display devices by introducing an additional 'inverse' transformation in the processing chain discussed above. As before, electronic correction system 50 includes optical elements (e.g. lenses, prisms, mirrors, etc.) and non-optical elements (e.g. electronic sensors and panels) 52 and 54 some or all of which may introduce an optical anomaly into the image processing chain as shown, as well as memory plane (i.e. storage plane) 56 and 58 which is assumed not to introduce any anomalies. While both a capture and a display device are shown, it should be understood that the present invention could be easily adapted for use with a capture or display device alone.

As discussed above in respect of FIG. 2, equations (2) to (7) describe the optical anomalies as transformations in the spatial and color domains. Image processor 51 applies arbitrary geometric (spatial) and color transformations to digital images. Spatial transformations are well known and it should be understood that similar transformations can be used to achieve color transformation. Implementation of these spatial transformations can be implemented by image processor 51 using various commercially available image warp circuits (e.g. the s ×W1 integrated circuit manufactured by Silicon Optix of San Jose, Calif.) where certain circuits work in the spatial domain and others can also apply color transformations.

Image processor 51 processes each color from an image independently, allowing the transformations to be different for the three channels. Image processor 51 is placed within the processing chain at the capture-display interface as shown. The transformations due to image processor 51 will be denoted by $$f^s_{wr}, f^s_{wg} \text{ and } f^s_{wb}$$

(first subscript w) for the three spatial mappings, and $f^c_{wr}, f^c_{wg}$ and $f^c_{wb}$ for the three-color mappings. The processing chain, as shown in FIG. 4 is now modified to:

$$(\overset{\rho}{x}, O_r, O_g, O_b) \rightarrow (\overset{\rho}{x'_r}, \overset{\rho}{x'_g}, \overset{\rho}{x'_b}, O'_r, O'_g, O'_b) \quad (19)$$

$$\overset{\rho}{x'_r} = f^s_{dr}(f^s_{wr}(f^s_{cr}(\overset{\rho}{x}))) \quad (20)$$

$$\overset{\rho}{x'_g} = f^s_{dg}(f^s_{wg}(f^s_{cg}(\overset{\rho}{x}))) \quad (21)$$

$$\overset{\rho}{x'_b} = f^s_{db}(f^s_{wb}(f^s_{cb}(\overset{\rho}{x}))) \quad (22)$$

$$O'_r = f^c_{dr}(f^c_{wr}(f^c_{cr}(O_r))) \quad (23)$$

$$O'_g = f^c_{dg}(f^c_{wg}(f^c_{cg}(O_g))) \quad (24)$$

$$O'_b = f^c_{db}(f^c_{wb}(f^c_{cb}(O_b))). \quad (25)$$

To eliminate the optical anomalies, the transformations utilized within image processor 51 are chosen such that equations (19) to (25) reduce to (13) to (17). Comparing equations (19) to (25) with equations (13) to (17) gives (it should be understood that multiplication in the relations below implies functional composition):

$$f^s_{wr} = f^{s-1}_{dr} h^s_d h^s_c f^{s-1}_{cr} \quad (26)$$

$$f^s_{wg} = f^{s-1}_{dg} h^s_d h^s_c f^{s-1}_{cg} \quad (27)$$

$$f^s_{wb} = f^{s-1}_{db} h^s_d h^s_c f^{s-1}_{cb} \quad (28)$$

$$f^c_{wr} = f^{c-1}_{dr} h^c_d h^c_c f^{c-1}_{cr} \quad (29)$$

$$f_{wg}^c = f_{dg}^{c^{-1}} h_d^c h_c^c f_{cg}^{c^{-1}} \quad (30)$$

$$f_{wb}^c = f_{db}^{c^{-1}} h_d^c h_c^c f_{cb}^{s^{-1}} \quad (31)$$

The above equations are obtained by appropriately equating (19) to (25) with (13) to (17). For example, to derive (26), set $$f_{dr}^s(f_{wr}^s(f_{cr}^s(\overset{p}{x}))) = h_d^s(h_c^s(\overset{w}{x})),$$

which implies on the functional level that $$f_{dr}^s f_{wr}^s f_{cr}^s = h_d^s h_c^s.$$

Then multiplying both sides from the left by $$f_{dr}^{s^{-1}}$$

and from the right by $$f_{cr}^{s^{-1}},$$

and canceling the inverses, leads to (26). Other equations are derived similarly.

When image processor 51 applies the transformations in equations (26) to (31), the optical anomalies of distortion, color non-convergence (excluding axial chromatic aberration) and luminance (chrominance) non-uniformity will be eliminated.

Implicit in transformations (26) to (31) is the filtering that accompanies any image warping. After the geometric transformations $$f_{wr}^s, f_{wg}^s$$

and $$f_{wb}^s$$

are applied; re-sampling (of all three channels) is needed to generate the new image or pixel data. In image processor 51, these filtering operations often take place before the color transformations $$f_{wr}^c, f_{wg}^c \text{ and } f_{wb}^c$$

are applied. The color mappings are then applied to the new filtered pixel data, implying that the anomaly correcting transformations (29) to (31) need to be based on the new image data.

Figure 5:
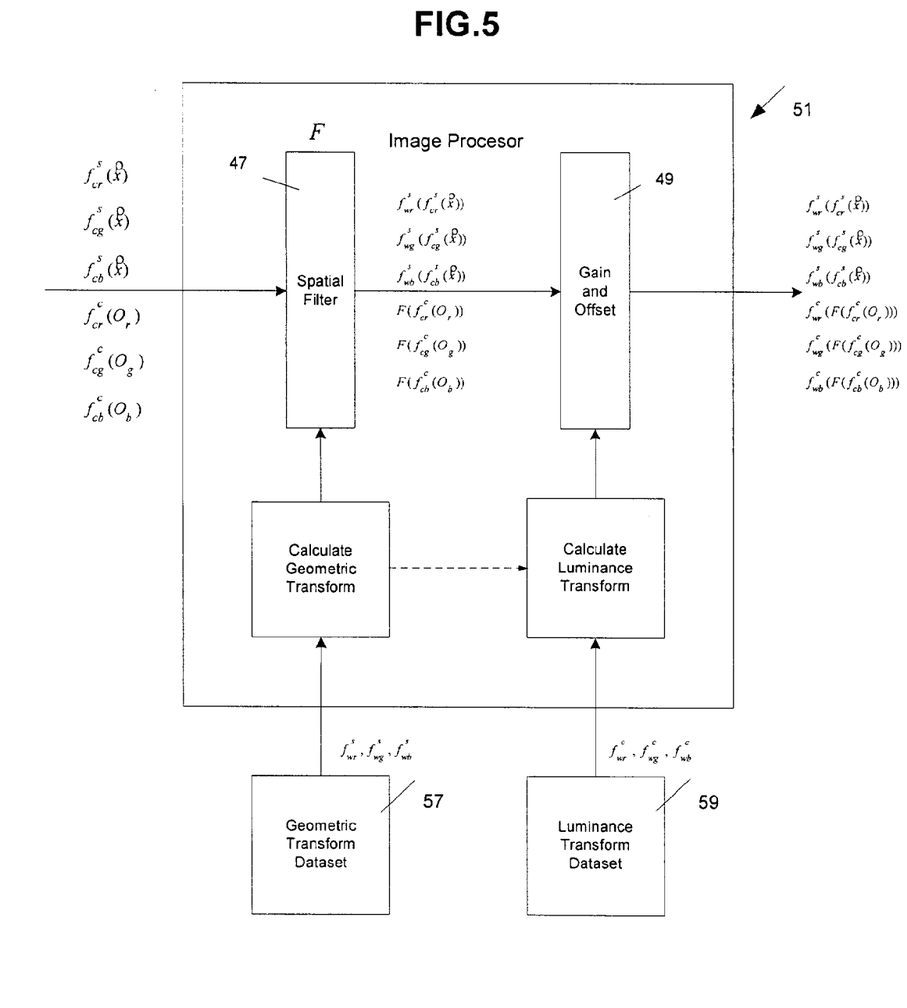
FIG. 5 is a schematic diagram of the correction module of the electronic correction system of FIG. 4 where the correction module has been adapted to correct for distortion and chrominance non-uniformity.

FIG. 5 illustrates the specific processing sequence that occurs within image processor 51, where a spatial filter 47 performs the filtering operation denoted by F. The geometric data received for each output pixel is used by spatial filter 47 to acquire a number of input pixels for transform by FIR filter to an output pixel value. Also, a gain and offset stage 49 is utilized to ensure that uniform luminance/chrominance results as previously discussed. As a specific example, transformation (29) will correct the luminance non-uniformity if the component mapping $$f_{cr}^{c^{-1}}$$

is chosen to act as follows:

$$f_{cr}^{c^{-1}}(F(f_{cr}^c(O_r))) = O_r, \quad (32)$$

or equivalently:

$$h_c^c(f_{cr}^{c^{-1}}(F(f_{cr}^c(O_r)))) = h_c^c(O_r), \quad (33)$$

and so forth for the other cases. Here spatial filter 47 is used to combine F with $$f_{cr}^{c^{-1}}$$

to eliminate the capture side luminosity anomaly. The filtering F is implicit in all processing chains or equations that include an image warping circuit. Also implicit is the fact that the color transformations are indirectly linked to the spatial transformations via the filtering. This means that a change in the spatial transformation will change the filtered pixel data, which in turn may require different color transformations. The spatial mappings can also directly interact with the color maps. It is contemplated that image processor 51 could be configured to allow for the dynamic modulation of the color map parameters according to the spatial data (e.g. positional/derivative information) being generated. This option is shown in FIG. 5 by the dotted arrow running between the space mapping element and the color-mapping element. The generation of the spatial mappings can be performed by an attached processing block or offline (i.e. not within image processor 51), and stored as depicted by geometric transform dataset 57 and luminance transform dataset 59 in FIG. 5.

Figure 6:
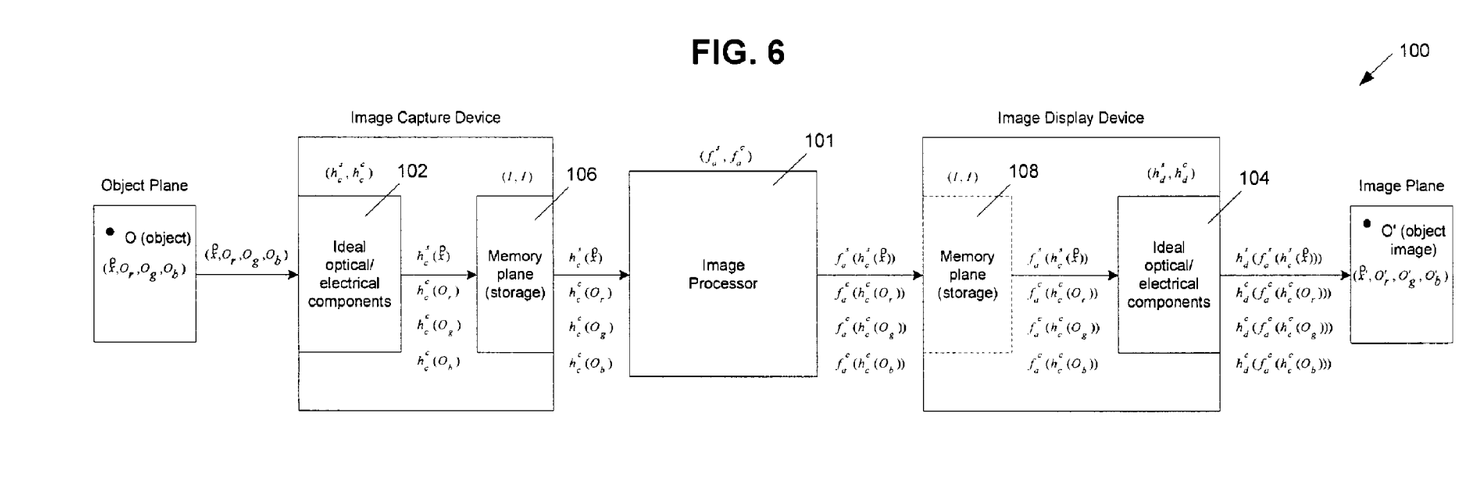
FIG. 6 is a schematic diagram of another example of an electronic correction system of the present invention that executes a geometric transform.

FIG. 6 illustrates another example electronic correction system 100 which uses image processor 101 to implement a further generalization of the transformations (26) to (31) to include an application specific "correction" or warping component (i.e. a component that is independent of the components that correct for the optical defects). As before, electronic correction system 100 includes optical elements (e.g. lenses, prisms, mirrors, etc.) and non-optical elements (e.g. electronic sensors and display panels) 102 and 104 some or all of which may introduce an optical anomaly into the image processing chain as shown, as well as memory plane (i.e. storage plane) 106 and 108 which is assumed not to introduce any anomalies.

Denoting the application specific mappings by $f_a^s$ and $f_a^c$ (subscript a), equations (26) to (31) become:

$$f_{wr}^s = f_{dr}^{s-1} h_d^s f_a^s h_c^s f_{cr}^{s-1} \quad (34)$$

$$f_{wg}^s = f_{dg}^{s-1} h_d^s f_a^s h_c^s f_{cg}^{s-1} \quad (35)$$

$$f_{wb}^s = f_{db}^{s-1} h_d^s f_a^s h_c^s f_{cb}^{s-1} \quad (36)$$

$$f_{wr}^c = f_{dr}^{c-1} h_d^c f_a^c h_c^c f_{cr}^{c-1} \quad (37)$$

$$f_{wg}^c = f_{dg}^{c-1} h_d^c f_a^c h_c^c f_{cg}^{c-1} \quad (38)$$

$$f_{wb}^c = f_{db}^{c-1} h_d^c f_a^c h_c^c f_{cb}^{s-1}. \quad (39)$$

With an application specific component, equation (33) becomes:

$$f_a^c(h_c^c(f_{cr}^{c-1}(F(f_{cr}^c(O_r))))) = f_a^c(\overline{F}(h_c^c(O_r))), \quad (40)$$

where $\overline{F}$, an "effective filtering", denotes the filtering accompanying $f_a^s$ in the absence of any anomalies. Now F plays a role in both eliminating the anomalies and applying the application specific filtering due to $f_a^s$. The filtering, F (and/or $\overline{F}$), is specified by correctly choosing $$f_{wi}^s \text{ and } f_{wi}^c,$$

i=r,g,b.

Figure 7:
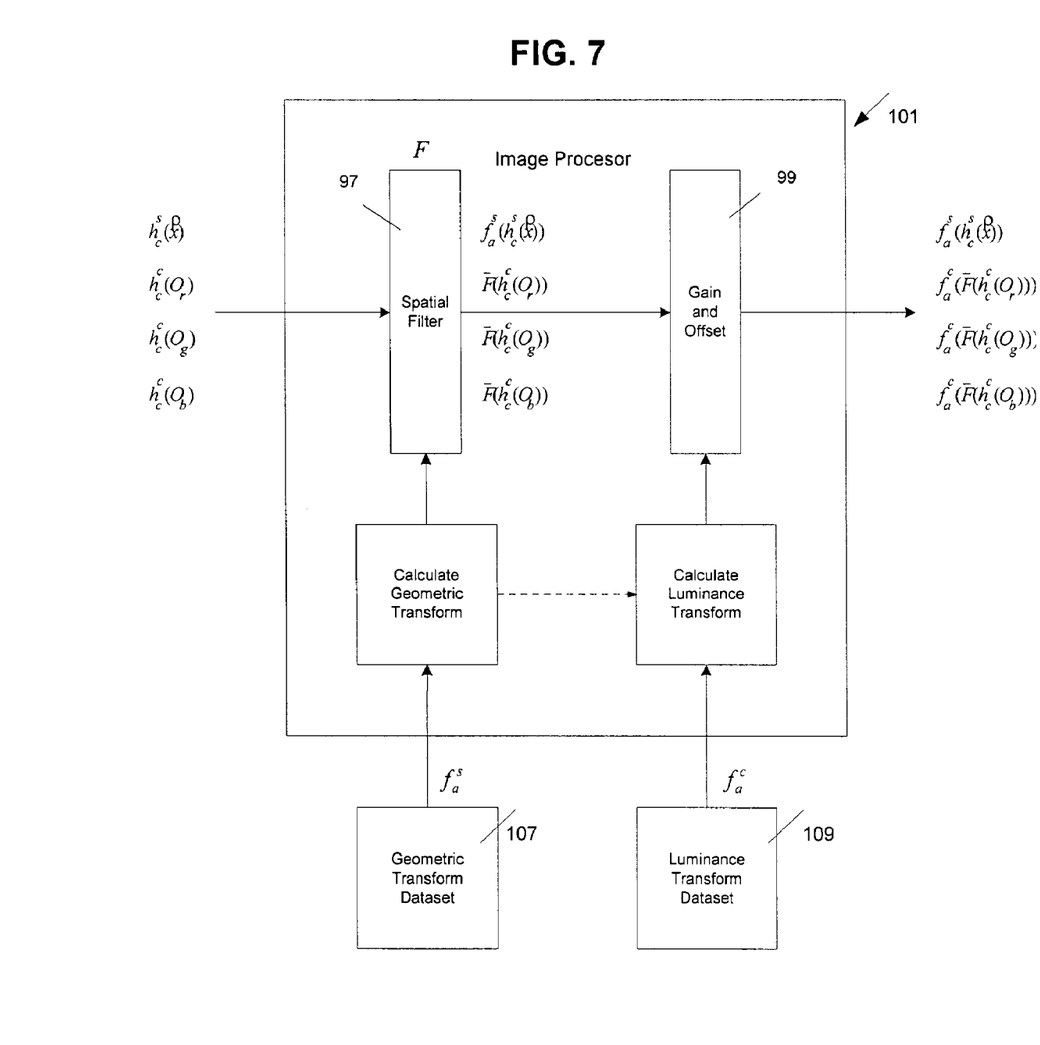
FIG. 7 is a schematic diagram of the correction module of the electronic correction system of FIG. 6 where the correction module has been adapted to implement an application specific geometric transform.

In general the mappings $f_a^s$ and $f_a^c$ can be different for the three colors, however, for most practical purposes these mappings are the same for all colors. It should be understood that having $f_a^s$ be different for the three colors is equivalently to 'artificially' introducing lateral chromatic aberration. It should be noted that $f_a^s$ and $f_a^c$ do not serve to correct the optical anomalies, and their inputs/outputs are assumed to be anomaly free. Accordingly, the effective processing chain, with the anomalies removed, is shown in FIG. 6. Once image processor 101 has eliminated the optical anomalies, image processor 101 effectively acts as an application specific image warping circuit. FIG. 7 shows an effective processing chain that resides inside the image processor 101.

An example of electronic correction system 100 (i.e. capture/display device) is one that applies transformations (34) to (39) and that films (captures) a scene and projects (displays) it onto a curved screen. In this case $f_a^s$ and $f_a^c$ will correct for the distortion (in position and/or color) that arises when projecting onto a curved screen. The remaining mapping components will correct for the optical anomalies due to the capture/display optical/electronic components. These remaining mapping components are device dependent mappings so that if the screen shape changes, only $f_a^s$ and $f_a^c$ change, whereas the device dependent mappings would be unchanged. That is, mappings $$f_{ci}^{s-1}, f_{di}^{s-1}, f_{ci}^{c-1}, f_{di}^{c-1},$$

$h_c^s$, $h_d^s$, $h_c^c$ and $h_d^c$, need only be computed once for a given device configuration. One application that might require different $f_a^c$ mappings for each color is that of color matching. In a situation where two overlapping images are projected onto a screen, where the resulting image is required to be continuous across the overlap region (i.e. where it is desired to split a large scene over several projectors), the three colors (in each image) in the overlap region need to be adjusted individually to present a seamless transition.

As previously noted, the method for representation and computation of the various mappings is an application/device dependent. The most general description of a mapping is in terms of a grid dataset. A grid dataset gives a representative set of pixels' input/output positions and colors values. Various methods can be used to generate a grid dataset. For optical elements, a ray-tracing program can be used to determine input and output pixel positions. Test patterns can also be run through the system to determine color shifts. Data on input and output brightness levels can determine the grid dataset (in color space) that describes the luminance correcting map.

For application specific transforms (keystone, cylinder, sphere, etc), a mathematical model can be used to generate the datasets analytically. Accordingly, the grid datasets for the inverse functions in transformations (34) to (39) can be computed by inverting the grid datasets from the 'forward' maps in transformations (2) to (7).

Once the individual datasets (corresponding to the five component functions on the right of (34) to (39)) are determined, these can be concatenated to give one grid dataset for each of the mappings (34) to (39). Concatenation can be done in several ways. One approach is to first fit or interpolate the individual datasets by 2D surfaces, such as splines, etc. These surfaces can then be functionally composed and evaluated in the correct order to obtain the final grid dataset. This process is repeated for each of the mappings (34) to (39). The composition/evaluation operation simply uses the range of one surface as the domain of the next surface, in order. Once we have the final six grid sets, these are then converted to a unifying 2D surface based functional format for representing arbitrary transformations. There are substantial benefits of using this unifying functional format over a (pixel based) grid dataset format. The final result is that (34)-(39) can be expressed as:

$$f_{wi}^s(x, y) = \sum_{m,n} a_{mn}^i x^m y^n \quad ((41))$$

$$f_{wi}^c(O_i, x, y) = \alpha_i(x, y) O_i + \beta_i(x, y) \quad ((42))$$

$$\alpha_i(x, y) = \sum_{m,n} A_{mn}^i x^m y^n \quad ((43))$$

$$\beta_i(x, y) = \sum_{m,n} B_{mn}^i x^m y^n \quad ((44))$$

The conventional understanding relating to spatial transformations, namely (41), can be applied to determine ((42) to ((44). Instead of the pixel positions (as in (41)), the coefficients of the color map ((42) are being fitted in ((43) to ((44). The surfaces ((43) to ((44) are determined in exactly the same manner as surface (41); only the meaning of the range is different. In ((42), the color map is taken to be linear; higher order functions may be used though the physical significance of higher order surfaces is not clear. Image processor 51 (FIG. 5) and 101 takes ((42) to be linear in $O_i$ and ((43) to ((44) to be linear in x and y.

Figure 8:
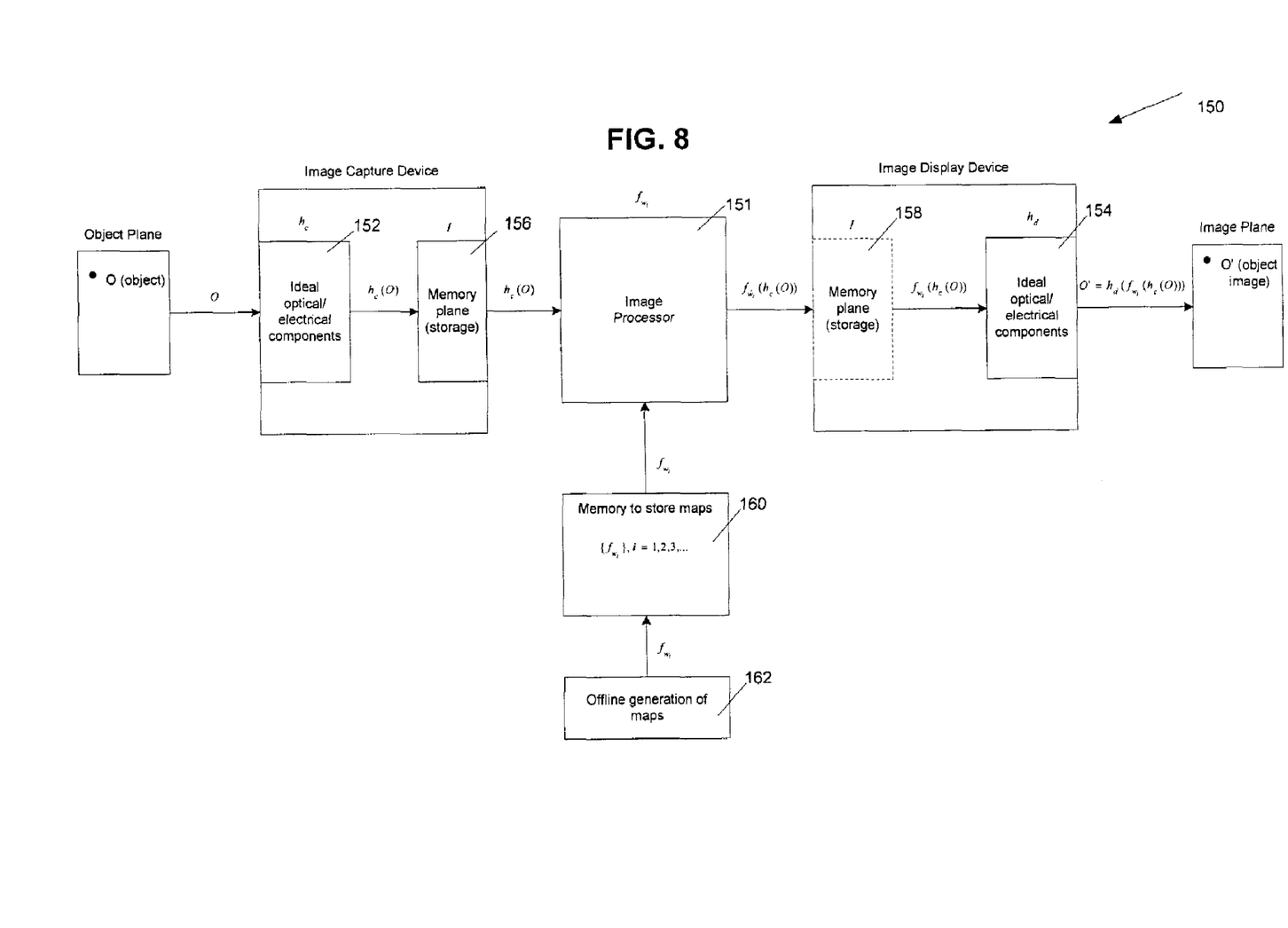
FIG. 8 is a schematic diagram of another example of an electronic correction system of the present invention that corrects optical anomalies, executes geometric transforms, and achieves dynamic correction.

FIG. 8 illustrates another example electronic correction system 150 which uses image processor 151 to achieve dynamic optical correction and image warping. As shown the different transformations which define the dynamic sequence can be computed using a map generator 162 and stored in an external memory 160. As before, electronic correction system 150 includes optical elements (e.g. lenses, prisms, etc.) and non-optical elements (e.g. electronic sensors and panels) 152 and 154 some or all of which may introduce an optical anomaly into the image processing chain as shown, as well as memory (i.e. storage plane) 156 and 158 which is assumed not to introduce any anomalies.

Electronic correction system 150 uses image processor 151 to store different mappings (i.e. more than one set of functions (41) to ((44)). Using this approach, situations where the optical anomalies (and/or application specific warping) change with time (at a reasonable rate) can be addressed. This corresponds to adaptive anomaly correction, where the mappings adapt to the changing anomalies. The functions can be pre-computed according to the dynamic changes and then loaded as needed. Dynamic application specific effects can also be included, for example a keystone correction that changes with time. Although it has been assumed that the mappings are computed offline, this need not be the case. Given enough computational power, the mappings could be calculated online (i.e. inside an integrated circuit) which will eliminate the memory block required to store the various maps.

The functions discussed above (41) to ((44) can be stored in image processor 51, 101 and 151 and in turn applied to the digital image data. The overall effect being that the ideal behavior is restored and only application specific warping remains. This provides an effective electronic solution to correcting optical anomalies, with the added benefit that any application specific image warping can also be included. Any changes to the application specific warping do not affect the anomaly correction mappings.

The above electronic solution to optical anomaly correction greatly reduces the cost of a system. In particular, expensive optical elements can be eliminated or replaced by cheaper components. The current circuit can correct distortion, lateral chromatic aberration and luminance/chrominance non-uniformity, as well as apply any application specific image warping. A prime market for electronic correction system 150, is in the area of high-resolution pixelated display systems which are used in HDTV's, PC monitors, projection TV's etc.

Figure 9:
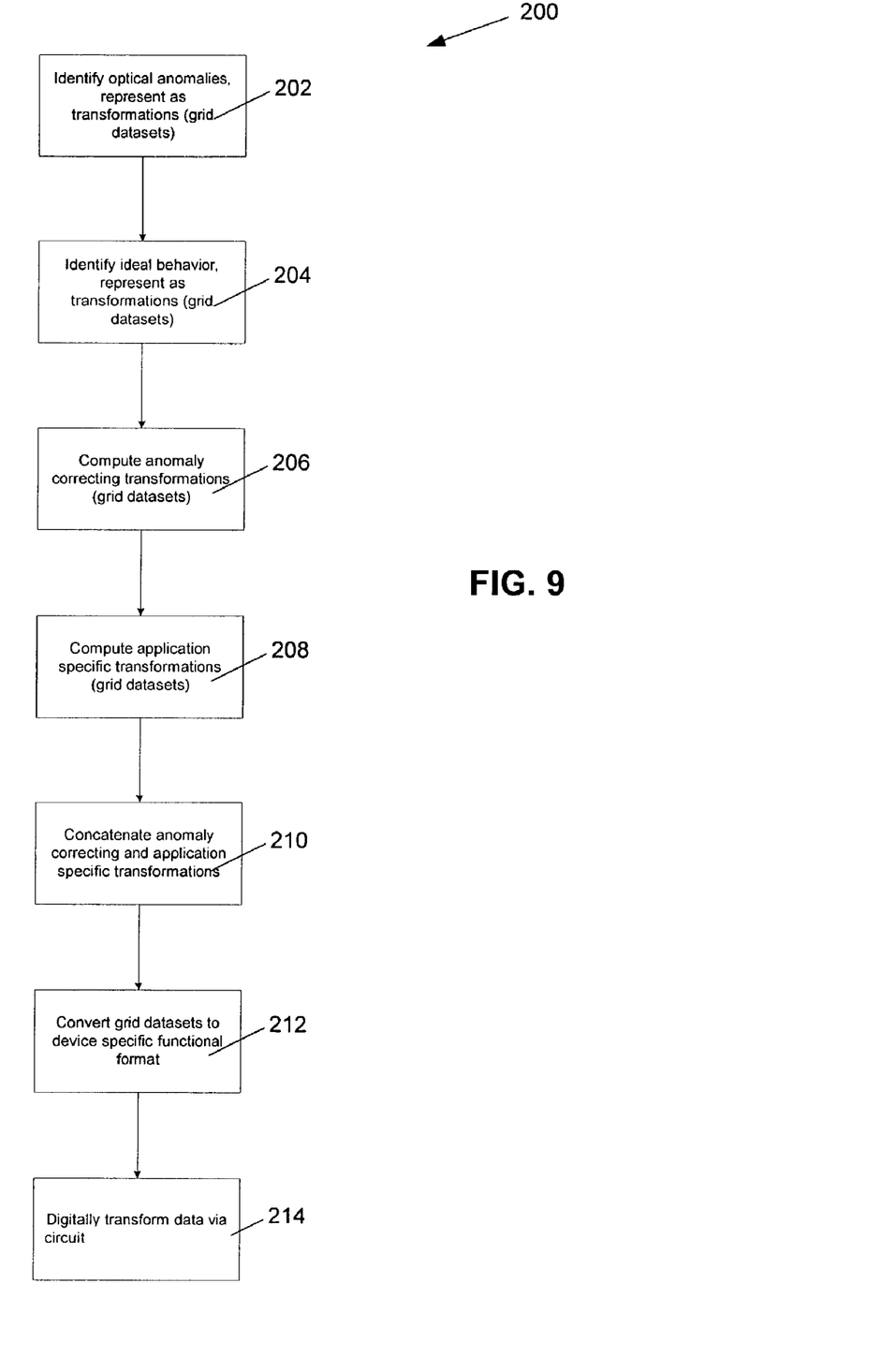
FIG. 9 is a flowchart illustrating the main steps of the electronic correction method of the present invention.

FIG. 9 is a flowchart that illustrates the main process steps associated with the electronic correction method 200 of the present invention made accordance with the present invention. As discussed in detail above, electronic correction method 200 eliminates optical anomalies common to image capture/display devices.

At step (202) an offline circuit, or possibly image processor 51, 101 and 151 identifies various optical anomalies and collectively represents them as transformations of pixel data. The transformations can be in spatial (positional) space and/or color space. As discussed above, the most general way of specifying a transformation is through grid datasets, which give a representative set of pixels' input/output positions and color values. At step (204), the ideal behavior of the processing chain is also identified and represented as grid datasets.

At step (206), the anomaly correcting transformations (i.e. in the form of grid datasets) is computed. These can be computed by inverting the grid datasets from the previous steps. At step (208), any application specific transformations (grid datasets) are computed. At step (210), the anomaly correcting and application specific transformations, or grid datasets, are concatenated into a single dataset. This gives one dataset, for each independent pixel variable, which specifies the complete 'warp' map that is to be applied electronically. There are six independent pixel variables, namely RGB positional values and RGB color values.

At step (212), the concatenated grid datasets are converted to a device specific functional format used by commercially available image warp circuits (e.g. the sxW1 integrated circuit manufactured by Silicon Optix of San Jose, Calif.). This functional description is capable of representing very general transformations in a manner that is appropriate for real-time, sub-pixel accurate, image processing. Finally, at step (214), the pixel data is digitally transformed, according to the pre-computed functional description, via the sxW1 integrated circuit. As a result, the final image, having gone through the capture/warping/display processing chain, is free of any anomalies and exhibits only the application specific image warping.

Electronic correction system 50, 100 and 150 and electronic correction method 200 provide efficient and cost-effective real-time electronic correction of aberrations that do not affect image sharpness, namely distortions and color non-convergence (excluding axial chromatic aberration) and luminance (or chrominance) non-uniformity. Each of these effects are modelled as transformations in either spatial (positional) space or color space. That is, once an aberration is expressed as a pixel transformation (affecting either pixel positions or pixel color content), it can be eliminated by applying the inverse transformation. The same approach also provides for application specific image processing and dynamic anomaly correction. Electronic correction method 200 is not restricted to display/projection devices or capture devices, but may be used in conjunction with any image processing chain containing a display and/or capture component. All corrections are represented as grid datasets or functions acting in spatial or color space, which allows different corrections to be concatenated through functional compositions.

As will be apparent to those skilled in the art, various modifications and adaptations of the structure described above are possible without departing from the present invention, the scope of which is defined in the appended claims.

The invention claimed is:

1. An electronic correction method for correcting a plurality of optical anomalies associated with image capture and image display of an optical image processed through optical capture and display components having physical and geometrical characteristics, by compensation of digital image pixel data associated with the optical image, said method comprising:

identifying and representing several optical anomalies associated with the physical and geometrical characteristics of the optical capture and display components as an optical anomaly grid dataset;

identifying and representing distortion free behavior of the optical capture and display components as an ideal grid dataset;

for the optical anomalies comparing the optical anomaly grid dataset with the ideal grid dataset and determining an anomaly correcting transformation dataset by performing an inverse spatial transform from the ideal grid dataset to the anomaly transform such that functional composition of the anomaly correction transformation with the optical anomaly grid dataset reduces to the ideal grid dataset;

representing the anomaly correcting transformation via surface based functionals;

applying the surface based functionals to the image pixel data to produce corrected image pixel data which when viewed is free of the optical anomaly.

2. The method of claim 1, wherein said optical anomalies are selected from the group consisting of: distortions, color non-convergence, luminance non-uniformity, and chrominance non-uniformity.

3. The method of claim 1, further comprising computing an application specific transformation which corrects for image scaling and geometric transformations selected from the group consisting of spherical, cylindrical, and keystone transformations.

4. The method of claim 1, wherein the anomaly correcting transformation is converted to a device specific functional representation.

5. The method of claim 1, further comprising storing a sequence of transformations to achieve dynamic anomaly correction.

6. The method of claim 1, wherein the anomaly correcting transformation is defined in at least one of position space and color space.

7. The method of claim 1, wherein the anomaly correcting transformation defines a set of correcting geometric transformations and a set of correcting color transformations.

8. The method of claim 7, wherein applying the surface based functionals to the image pixel data further comprises
    (i) applying the set of correcting geometric transformations;
    (ii) applying a set of filtering operations; and
    (iii) applying the set of correcting color transformations.

9. The method of claim 1, wherein the image pixel data is associated with at least one of a capture device and a display device.

10. An electronic correction system for correcting a plurality of optical anomalies associated with the capture and display of an optical image processed through optical capture and display components having physical and geometrical characteristics, by compensation of the digital image pixel data associated with the optical image, said system comprising an image processor for:
    identifying and representing several optical anomalies of the physical and geometrical characteristics of the optical capture and display optical components as an optical anomaly grid dataset;
    identifying and representing the ideal behavior of the image data processing chain as an ideal grid dataset;
    for the optical anomalies comparing the optical anomaly grid dataset with the ideal grid dataset and determining an anomaly correcting transformation dataset by performing an inverse spatial transform from the ideal grid dataset to the anomaly transform such that functional composition of the anomaly correcting transformation with the optical anomaly grid dataset reduces to the ideal grid dataset;
    representing the anomaly correcting transformation via surface based functionals;
    applying the surface based functionals to the image pixel data to produce corrected image pixel data which viewed is free of the optical anomaly.

11. The system of claim 10, wherein said optical anomalies are selected from the group consisting of: distortions, color non-convergence, luminance non-uniformity and chrominance non-uniformity.

12. The system of claim 10, further comprising an application module for computing an application specific transformation which corrects for image scaling and geometric transformations selected from the group consisting of spherical, cylindrical, and keystone transformations.

13. The system of claim 10, wherein the image processor is further adapted to convert the anomaly correcting transformation to a device specific functional representation.

14. The system of claim 10, wherein the image processor is further adapted to store a sequence of transformations to achieve dynamic anomaly correction.

15. The system of claim 10, wherein the optical anomaly grid is defined in at least one of position space and color space.

16. The system of claim 10, wherein the anomaly correcting transformation defines a set of correcting geometric transformations and a set of correcting color transformations.

17. The system of claim 16, wherein the image processor is further adapted to:
    (i) apply the set of correcting geometric transformations;
    (ii) apply a set of filtering operations; and
    (iii) apply the set of correcting color transformations.

18. The system of claim 10, further comprising an image display device coupled to the image processor for displaying said corrected image pixel data.

19. The system of claim 10, further comprising an image capture device coupled to the image processor for capturing said digital image pixel data.

20. A computer-readable medium having computer-readable instructions embodied therein for correcting a plurality of optical anomalies associated with image capture and image display of an optical image processed through optical capture and display components having a physical and geometrical characteristics, by compensation of digital image pixel data associated with the optical image, by:
    identifying and representing several optical anomalies associated with the physical and geometrical characteristics of the optical capture and display components as an anomaly grid dataset;
    identifying and representing distortion free behavior of the optical capture and display optical components as an ideal grid dataset;
    for the optical anomalies comparing the optical anomaly grid dataset with the ideal grid dataset and determining an anomaly correcting transformation dataset by performing an inverse spatial transform from the ideal grid dataset to the anomaly transform such that functional composition of the anomaly correcting transformation with the optical anomaly grid dataset reduces to the ideal grid dataset;
    representing the anomaly correcting transformation via surface based functionals;
    applying the surface based functionals to the image pixel data to produce corrected image pixel data which when viewed is free of the optical anomaly.

21. The computer-readable medium of claim 20, wherein said optical anomalies are selected from the group consisting of: distortions, color non-convergence, luminance non-uniformity, and chrominance non-uniformity.

22. The computer-readable medium of claim 20, further including an application specific transformation is computed that corrects for image scaling and geometric transformations selected from the group consisting of spherical, cylindrical, and keystone transformations.

23. The computer-readable medium of claim 20, wherein the anomaly correcting transformation is converted to a device specific functional representation.

24. The computer-readable medium of claim 20, wherein a sequence of transformations are stored to achieve dynamic anomaly correction.

25. The computer-readable medium of claim 20, wherein the anomaly correcting transformation is defined in at least one of position space and color space.

26. The computer-readable medium of claim 20, wherein the anomaly correcting transformation defines a set of correcting geometric transformations and a set of correcting color transformations.

27. The computer-readable medium of claim 26, wherein applying the surface based functionals to the image pixel data further comprises
   (i) applying the set of correcting geometric transformations;
   (ii) applying a set of filtering operations; and
   (iii) applying the set of correcting color transformations.

28. The method of claim 1, further representing the optical anomaly grid dataset as a surface functional.

29. The method of claim 28, further concatenating several surface functionals associated with several optical anomalies.

30. The system of claim 10, further representing the optical anomaly grid dataset as a surface functional.

31. The system of claim 30, further concatenating several surface functionals associated with several optical anomalies.

32. The computer-readable medium of claim 20, further representing the optical anomaly grid dataset as a surface functional.

33. The computer-readable medium of claim 32, further concatenating several surface functionals associated with several optical anomalies.

34. The method of claim 1, wherein an anomaly correction function is used for each of the plurality of optical anomaly such that a range of one anomaly correction function is a domain of another anomaly correction.

* * * * *